(12) United States Patent
Minakuchi et al.

(10) Patent No.: US 11,318,804 B2
(45) Date of Patent: May 3, 2022

(54) VEHICLE STATE ESTIMATION DEVICE, CONTROL DEVICE, SUSPENSION CONTROL DEVICE, AND SUSPENSION DEVICE

(71) Applicant: HITACHI ASTEMO, LTD., Ibaraki (JP)

(72) Inventors: Yuichiro Minakuchi, Tochigi (JP); Masaki Izawa, Tochigi (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 374 days.

(21) Appl. No.: 16/601,247

(22) Filed: Oct. 14, 2019

(65) Prior Publication Data

US 2020/0039314 A1 Feb. 6, 2020

Related U.S. Application Data

(63) Continuation of application No. PCT/JP2017/022732, filed on Jun. 20, 2017.

(30) Foreign Application Priority Data

May 30, 2017 (JP) .............................. JP2017-106898

(51) Int. Cl.
*B60G 17/0165* (2006.01)
*G07C 5/08* (2006.01)

(52) U.S. Cl.
CPC ............ *B60G 17/0165* (2013.01); *G07C 5/08* (2013.01); *B60G 2400/0521* (2013.01);
(Continued)

(58) Field of Classification Search
CPC ........ B60G 17/0165; B60G 2400/0521; B60G 2400/0522; B60G 2400/206;
(Continued)

(56) References Cited

U.S. PATENT DOCUMENTS

| | | |
|---|---|---|
| 4,693,485 A | 9/1987 | Kamei et al. |
| 5,276,621 A | 1/1994 | Henry |

(Continued)

FOREIGN PATENT DOCUMENTS

| | | |
|---|---|---|
| DE | 40 39 629 C2 | 6/1993 |
| DE | 100 19 763 A1 | 11/2000 |

(Continued)

OTHER PUBLICATIONS

US 6,243,631 B1, 06/2001, Ohsaku (withdrawn)
(Continued)

*Primary Examiner* — Yuen Wong
(74) *Attorney, Agent, or Firm* — Casimir Jones, S.C.; Brian F. Bradley (57) ABSTRACT

It is an object of the present invention to suitably estimate a state of a vehicle. A vehicle state estimation section (1200) includes: a main computation section (1210) configured to carry out linear computation with respect to a state amount related to a state of a vehicle; and a tire model computation section (1240) configured to carry out nonlinear computation with direct or indirect reference to at least part of a result of the linear computation carried out by the main computation section (1210).

14 Claims, 5 Drawing Sheets

(52) U.S. Cl.
CPC .......... *B60G 2400/0522* (2013.01); *B60G 2400/206* (2013.01); *B60G 2400/208* (2013.01); *B60G 2400/821* (2013.01); *B60G 2500/10* (2013.01); *B60G 2500/11* (2013.01)

(58) Field of Classification Search
CPC ........ B60G 2400/208; B60G 2400/821; B60G 2500/10; B60G 2500/11; B60G 2800/162; B60G 2800/916; B60G 17/0182; B60G 17/0195; B60G 17/08; B60G 2600/1875; G07C 5/08; G07C 5/0808; B60W 10/22; B60W 40/10; B60W 40/11; B60W 40/112
See application file for complete search history.

(56) References Cited

U.S. PATENT DOCUMENTS

| | | |
|---|---|---|
| 5,408,411 A | 4/1995 | Nakamura |
| 5,434,782 A | 7/1995 | Henry |
| 5,444,621 A | 8/1995 | Matsunaga |
| 5,475,596 A | 12/1995 | Henry |
| 5,497,324 A | 3/1996 | Henry |
| 5,682,968 A | 11/1997 | Boichot |
| 5,765,118 A | 6/1998 | Fukatani |
| 5,931,887 A | 8/1999 | Hac |
| 6,035,251 A | 3/2000 | Hac |
| 6,366,841 B1 | 4/2002 | Ohsaku |
| 6,556,908 B1 | 4/2003 | Lu |
| 6,564,129 B2 | 5/2003 | Badenoch |
| 6,671,596 B2 | 12/2003 | Kawashima |
| 7,065,440 B2 | 6/2006 | Aral |
| 7,076,351 B2 | 7/2006 | Hamilton |
| 7,593,797 B2 | 9/2009 | Izawa |
| 7,831,353 B1 | 11/2010 | Barron |
| 8,116,938 B2 | 2/2012 | Itagaki |
| 8,165,749 B2 | 4/2012 | Izawa |
| 8,311,704 B2 | 11/2012 | Kato |
| 8,560,171 B2 | 10/2013 | Hozumi |
| 8,718,872 B2 | 5/2014 | Hirao |
| 9,156,328 B2 | 10/2015 | Kikuchi |
| 9,452,653 B2 | 9/2016 | Kikuchi |
| 10,059,344 B2 | 8/2018 | Hirao |
| 10,241,215 B2 | 3/2019 | Medagoda |
| 10,384,672 B1 | 8/2019 | Katzourakis |
| 2002/0128760 A1 | 9/2002 | Bodie |
| 2003/0110148 A1 | 6/2003 | Ulyanov |
| 2004/0176889 A1 | 9/2004 | Capito |
| 2004/0254707 A1 | 12/2004 | Lu |
| 2005/0049761 A1 | 3/2005 | Kataoka et al. |
| 2005/0090943 A1 | 4/2005 | Kogure et al. |
| 2005/0131604 A1 | 6/2005 | Lu |
| 2005/0182548 A1 | 8/2005 | Bernzen et al. |
| 2005/0216146 A1 | 9/2005 | Bauer et al. |
| 2005/0273209 A1 | 12/2005 | Bernzen et al. |
| 2006/0085112 A1 | 4/2006 | Lu |
| 2006/0089771 A1 | 4/2006 | Messih |
| 2006/0190150 A1 | 8/2006 | Milot |
| 2006/0267750 A1 | 11/2006 | Lu |
| 2007/0017727 A1 | 1/2007 | Messih |
| 2008/0054537 A1 | 3/2008 | Harrison |
| 2008/0059021 A1 | 3/2008 | Lu |
| 2008/0183353 A1 | 7/2008 | Post |
| 2009/0012688 A1 | 1/2009 | Hattori et al. |
| 2009/0088918 A1 | 4/2009 | Takenaka |
| 2009/0292419 A1 | 11/2009 | Itagaki et al. |
| 2010/0145549 A1 | 6/2010 | Lee |
| 2010/0198448 A1 | 8/2010 | Ono |
| 2011/0127127 A1 | 6/2011 | Hirao |
| 2012/0179342 A1 | 7/2012 | Noumura |
| 2013/0151074 A1 | 6/2013 | Takeuchi |
| 2013/0166121 A1 | 6/2013 | Takeuchi |
| 2013/0226405 A1 | 8/2013 | Koumura |
| 2015/0066295 A1 | 3/2015 | Kanda |
| 2015/0105978 A1 | 4/2015 | Nakatsu |
| 2015/0174981 A1 | 6/2015 | Buma |
| 2015/0224845 A1 | 8/2015 | Anderson |
| 2015/0290995 A1 | 10/2015 | Kanda |
| 2015/0294161 A1 | 10/2015 | Schamp |
| 2016/0176259 A1* | 6/2016 | Yamamoto ........... B60G 17/018 701/37 |
| 2016/0347142 A1 | 12/2016 | Seong et al. |
| 2017/0106855 A1 | 4/2017 | Lavoie |
| 2017/0137023 A1 | 5/2017 | Anderson et al. |
| 2017/0197485 A1 | 7/2017 | Sohn |
| 2018/0089900 A1 | 3/2018 | Rober et al. |
| 2018/0111439 A1 | 4/2018 | Yamamoto |
| 2019/0263210 A1 | 8/2019 | Nasu et al. |

FOREIGN PATENT DOCUMENTS

| | | |
|---|---|---|
| DE | 102 15 465 A1 | 10/2003 |
| DE | 10 2009 021 950 A1 | 12/2009 |
| DE | 10 2012 010 553 A1 | 12/2013 |
| EP | 2 052 885 A2 | 4/2009 |
| JP | 61-178212 | 8/1986 |
| JP | 3-186416 | 8/1991 |
| JP | 2002-283879 | 10/2002 |
| JP | 2003-212141 | 7/2003 |
| JP | 2004-168148 | 6/2004 |
| JP | 2004-189117 | 7/2004 |
| JP | 2005-125986 | 5/2005 |
| JP | 2005-271914 | 10/2005 |
| JP | 2008-087724 | 4/2008 |
| JP | 2016-117326 | 6/2016 |
| JP | 2017-026320 | 2/2017 |
| WO | WO 03/076243 A1 | 9/2003 |

OTHER PUBLICATIONS

English Translation of the International Preliminary Report on Patentability, International Patent Application No. PCT/JP2017/022732, dated Dec. 12, 2019, 7 pages.

English Translation of the International Preliminary Report on Patentability, International Patent Application No. PCT/JP2017/022733, dated Dec. 12, 2019, 8 pages.

Allowance for JP Patent Application No. 2017-106899, dated Jan. 16, 2018, 3 pages.

1st Office Action for JP Patent Application No. 2017-106899, dated Aug. 22, 2017, 9 pages.

International Search Report for International Patent Application No. PCT/JP2017/022733, dated Aug. 22, 2017, 2 pages.

Allowance for JP Patent Application No. 2017-106898, dated Jan. 16, 2018, 3 pages.

1st Office Action for JP Patent Application No. 2017-106898, dated Aug. 22, 2017, 7 pages.

International Search Report for International Patent Application No. PCT/JP2017/022732, dated Aug. 22, 2017, 2 pages.

Office Action for DE 112017007602.1, dated Apr. 26, 2021, 8 total pages.

Advisory Action for U.S. Appl. No. 16/601,252, dated May 17, 2021, 5 pages.

Office Action for U.S. Appl. No. 16/601,252, dated Jul. 12, 2021, 40 pages.

Office Action for DE 112017007602.1, dated Feb. 10, 2021, 8 pages.

Office Action For U.S. Appl. No. 16/601,252, dated Mar. 1, 2021.

Office Action for U.S. Appl. No. 16/601,252, dated Nov. 30, 2020.

* cited by examiner

VEHICLE STATE ESTIMATION DEVICE, CONTROL DEVICE, SUSPENSION CONTROL DEVICE, AND SUSPENSION DEVICE

This application is a Continuation of PCT International Application No. PCT/JP2017/022732 filed in Japan on Jun. 20, 2017, which claims the benefit of Patent Application No. 2017-106898 filed in Japan on May 30, 2017, the entire contents of which are hereby incorporated by reference.

TECHNICAL FIELD

The present invention relates to a vehicle state estimation device, a control device, a suspension control device, and a suspension device each of which estimates a state of a vehicle.

BACKGROUND ART

There has been known a technology for improving riding comfort of a vehicle by estimating a state of the vehicle and controlling the vehicle on the basis of the state estimated. This technology uses a model of a vehicle in order to estimate a state of the vehicle.

For example, Patent Literature 1 discloses a technology in which a control amount by which a vehicle adjustment member is controlled is determined on the basis of an optimum feedback gain that has been preset in accordance with a dynamic model related to a height of a vehicle.

Further, Patent Literature 2 discloses a technology of obtaining an estimated yaw rate and a reference yaw rate on the basis of a model of a vehicle and controlling a steering characteristic on the basis of these yaw rates.

CITATION LIST

Patent Literature

Patent Literature 1
Japanese Patent Application Publication, Tokukaisho, No. 61-178212 (Publication Date: Aug. 9, 1986)
Patent Literature 2
Japanese Patent Application Publication, Tokukai, No. 2004-189117 (Publication Date: Jul. 8, 2004)

SUMMARY OF INVENTION

Technical Problem

It is an object of the present invention to provide: a vehicle state estimation device and a control device each of which can suitably estimate a state of a vehicle; and a suspension control device and a suspension device each of which can achieve excellent ride comfort.

Solution to Problem

In order to attain the object, a vehicle state estimation device in accordance with the present invention is an in-vehicle vehicle state estimation device configured to estimate a state of a vehicle, the in-vehicle vehicle state estimation device including a vehicle model computation section configured to carry out computation with use of a vehicle model, the vehicle model computation section including: a linear computation section configured to calculate one or more output values by carrying out, with reference to one or more input values, linear computation with respect to a state amount related to the state of the vehicle; and a nonlinear computation section configured to carry out nonlinear computation with direct or indirect reference to at least part of a result of the linear computation carried out by the linear computation section.

Further, in order to attain the object, a control device in accordance with the present invention is a control device, including: a vehicle state estimation section configured to estimate a state of a vehicle; a reference vehicle model computation section configured to carry out computation related to a reference vehicle model; a subtractor configured to carry out subtraction, from an estimation output that is an output value outputted from the vehicle state estimation section, of a reference output that is an output value outputted from the reference vehicle model computation section; an integrator configured to carry out integration of a result of the subtraction carried out by the subtractor; a first amplifier configured to carry out amplification of an estimation state amount that is a subject of computation carried out by the vehicle state estimation section; a second amplifier configured to carry out amplification of a result of the integration carried out by the integrator; a third amplifier configured to carry out amplification of a state amount that is a subject of the computation carried out by the reference vehicle model computation section; and an adder configured to carry out addition of a result of the amplification carried out by the first amplifier, a result of the amplification carried out by the second amplifier, and a result of the amplification carried out by the third amplifier, the vehicle state estimation section including a vehicle model computation section configured to carry out computation with use of a vehicle model, the vehicle model computation section including: a linear computation section configured to calculate one or more output values by carrying out, with reference to one or more input values, linear computation with respect to a state amount related to the state of the vehicle; and a nonlinear computation section configured to carry out nonlinear computation with direct or indirect reference to at least part of a result of the linear computation carried out by the linear computation section.

Further, a suspension control device in accordance with the present invention is a suspension control device configured to control a damping force of a suspension, the suspension control device including a vehicle state estimation section configured to estimate a state of a vehicle, the vehicle state estimation section including: a linear computation section configured to calculate one or more output values by carrying out, with reference to one or more input values, linear computation with respect to a state amount related to the state of the vehicle; and a nonlinear computation section configured to carry out nonlinear computation with direct or indirect reference to at least part of a result of the linear computation carried out by the linear computation section.

Further, a suspension device in accordance with the present invention is a suspension device, including: a suspension; and a suspension control section configured to control a damping force of the suspension, the suspension control section including a vehicle state estimation section configured to estimate a state of a vehicle, the vehicle state estimation section including: a linear computation section configured to calculate one or more output values by carrying out, with reference to one or more input values, linear computation with respect to a state amount related to the state of the vehicle; and a nonlinear computation section configured to carry out nonlinear computation with direct or indirect reference to at least part of a result of the linear computation carried out by the linear computation section.

Advantageous Effects of Invention

According to a vehicle state estimation device in accordance with the present invention, it is possible to suitably estimate a state of a vehicle. Further, according to a suspension control device and a suspension device in accordance with the present invention, it is possible to achieve excellent ride comfort.

DESCRIPTION OF EMBODIMENTS

Embodiment 1

The following description will discuss Embodiment 1 of the present invention in detail.

Figure 1:
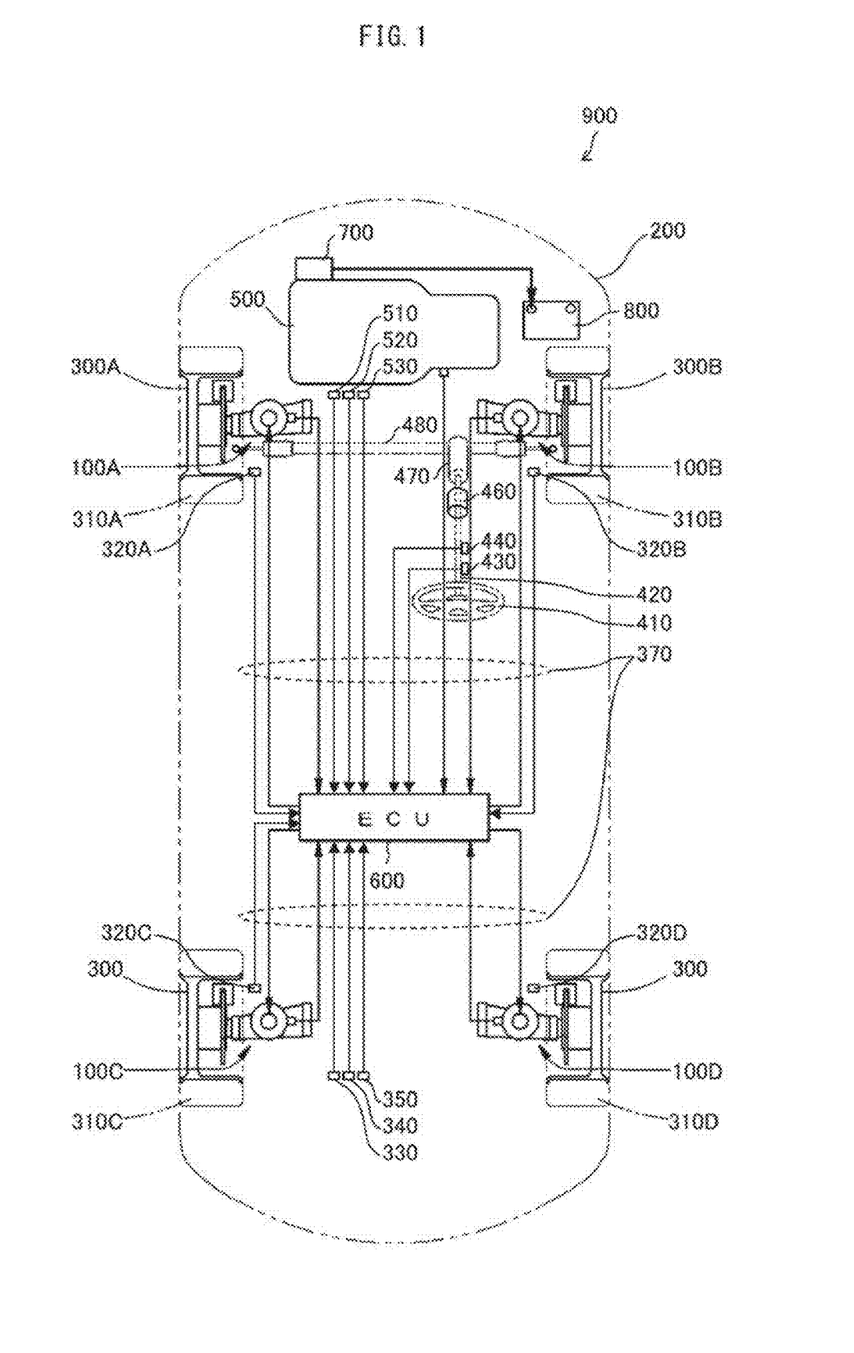
FIG. 1 is a view schematically illustrating a configuration of a vehicle in accordance with Embodiment 1 of the present invention.

Configuration of Vehicle 900 FIG. 1 is a view schematically illustrating a configuration of a vehicle 900 in accordance with Embodiment 1. As illustrated in FIG. 1, the vehicle 900 includes suspensions 100, a vehicle body 200, wheels 300, tires 310, a steering member 410, a steering shaft 420, a torque sensor 430, a rudder angle sensor 440, a torque application section 460, a rack-and-pinion mechanism 470, a rack axis 480, an engine 500, an ECU (Electronic Control Unit) (control device, steering control device, suspension control device, suspension control section) 600, a power generator 700, and a battery 800. Note that the suspensions 100 and the ECU 600 constitute a suspension device in accordance with Embodiment 1.

The wheels 300, to which the tires 310 are mounted, are suspended from the vehicle body 200 with use of the suspensions 100. The vehicle 900 is a four-wheel vehicle, and includes four suspensions 100, four wheels 300, and four tires 310, accordingly.

Note that a tire and a wheel for a left front wheel, a right front wheel, a left rear wheel, and a right rear wheel may be referred to respectively as a tire 310A and a wheel 300A, a tire 310B and a wheel 300B, a tire 310C and a wheel 300C, and a tire 310D and a wheel 300D. Likewise, a configuration associated with the left front wheel, the right front wheel, the left rear wheel, and the right rear wheel may hereinafter be represented with use of reference signs "A," "B," "C," and "D," respectively.

The suspensions 100 each include a hydraulic shock absorber, an upper arm, and a lower arm. The hydraulic shock absorber, for example, includes a solenoid valve which is an electromagnetic valve that adjusts a damping force generated by the hydraulic shock absorber. Note, however, that Embodiment 1 is not limited to this. The hydraulic shock absorber may employ, as the electromagnetic valve that adjusts a damping force, an electromagnetic valve other than a solenoid valve. For example, the hydraulic shock absorber may include, as the electromagnetic valve, an electromagnetic valve that utilizes a magnetohydrodynamic flow (a magnetic fluid).

The power generator 700 is annexed to the engine 500, and electricity generated by the power generator 700 is accumulated in the battery 800.

The steering member 410, which is operated by a driver, is connected to one end of the steering shaft 420 so that the steering member 410 can transmit a torque to the one end. The other end of the steering shaft 420 is connected to the rack-and-pinion mechanism 470.

The rack-and-pinion mechanism 470 is a mechanism for converting a rotation about an axis of the steering shaft 420 into a displacement of the rack axis 480 along an axial direction of the rack axis 480. In a case where the rack axis 480 is displaced along the axial direction, the wheel 300A and the wheel 300B are steered, each via a tie rod and a knuckle arm.

The torque sensor 430 detects a steering torque applied to the steering shaft 420, i.e., a steering torque applied to the steering member 410, and provides, to the ECU 600, a torque sensor signal indicative of a result thus detected. More specifically, the torque sensor 430 detects of a twist of a torsion bar provided inside the steering shaft 420 and outputs a result thus detected as the torque sensor signal. Note that the torque sensor 430 may be a magnetostrictive torque sensor.

The rudder angle sensor 440 detects a rudder angle of the steering member 410 and provides a result thus detected to the ECU 600.

The torque application section 460 applies, to the steering shaft 420, an assist torque or a reaction torque in accordance with a steering control amount supplied from the ECU 600. The torque application section 460 includes (i) a motor that generates the assist torque or the reaction torque in accordance with the steering control amount and (ii) a torque transmission mechanism that transmits the torque generated by the motor to the steering shaft 420.

Note that specific examples of "control amount" herein encompass electric current value, duty ratio, damping factor, damping ratio, and the like.

Note that in the above description, the expression "connected so that . . . can transmit a torque" means that one member is connected to the other member so that a rotation of the one member causes a rotation of the other member. For example, the expression encompass at least (i) a case in which one member and the other member are integrally molded, (ii) a case in which one member is directly or indirectly fixed to the other member, and (iii) a case in which one member and the other member are connected to each other so that the one member and the other member move in conjunction with each other via a joint member or the like.

Further, although the above example of a steering device has a configuration in which the members from the steering member 410 through the rack axis 480 are always mechanically connected to one another, Embodiment 1 is not limited to this. The steering device in accordance with Embodiment 1 may be a steer-by-wire type steering device, for example. The following description in the present specification is also applicable to the steer-by-wire type steering device.

The ECU 600 centrally controls various electronic devices included in the vehicle 900. More specifically, the ECU 600 adjusts a steering control amount to be supplied to the torque application section 460, thereby controlling an intensity of an assist torque or a reaction torque to be applied to the steering shaft 420.

Further, the ECU 600 controls the suspensions 100 by supplying a suspension control amount. More specifically, the ECU 600 supplies, to the solenoid valve of the hydraulic shock absorber included in each of the suspensions 100, a suspension control amount so as to control the solenoid valve to open and close. To enable this control, an electric power line is provided for supplying, from the ECU 600 to the solenoid valve electricity, electricity for driving the solenoid valve.

Further, the vehicle 900 includes (i) wheel speed sensors 320 that are provided for the respective wheels 300 and each detect a wheel speed of a corresponding one of the wheels 300 (an angular speed of the corresponding one of the wheels), (ii) a lateral G sensor 330 that detects an acceleration in a lateral direction of the vehicle 900, (iii) a front and rear G sensor 340 that detects an acceleration in a front and rear direction of the vehicle 900, (iv) a yaw rate sensor 350 that detects a yaw rate of the vehicle 900, (v) an engine torque sensor 510 that detects a torque generated by the engine 500, (vi) an engine RPM sensor 520 that detects an RPM of the engine 500, and (vii) a brake pressure sensor 530 that detects a pressure applied to a brake fluid that a braking device has. Results detected by these various sensors are supplied to the ECU 600.

Although not illustrated, the vehicle 900 includes the braking device, which can be controlled by (i) an antilock brake system (ABS) that is a system for preventing wheels from locking up during braking, (ii) a traction control system (TCS) for preventing wheels from spinning out during acceleration or the like, and (iii) a vehicle stability assist (VSA) which is a control system for stabilizing vehicle behaviors and is capable of yaw moment control during turning, automatic braking for a brake assist function, and the like.

Note that the ABS, the TCS, and the VSA (i) compare a wheel speed, which is determined in accordance with an estimated car body speed, with a wheel speed, which is detected by each wheel speed sensor 320 and (ii) in a case where the values of these two wheel speeds differ by a predetermined value or more, determine that the wheel is slipping. Through this process, the ABS, the TCS, and the VSA carry out an optimum brake control and/or an optimum traction control in accordance with a driving state of the vehicle 900, so as to contribute to the stabilization of behaviors of the vehicle 900.

Supply of results detected by the above-described various sensors and transmission of a control signal from the ECU 600 to sections are carried out via a controller area network (CAN) 370.

Suspensions 100

Figure 2:
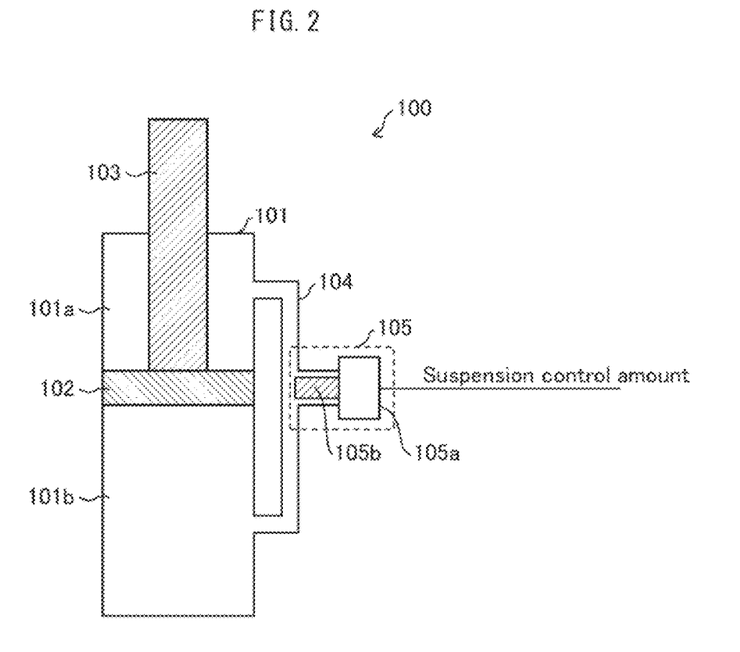
FIG. 2 is a cross-sectional view schematically illustrating an example of a schematic configuration of a hydraulic shock absorber of a suspension in accordance with Embodiment 1 of the present invention.

FIG. 2 is a cross-sectional view schematically illustrating an example of a configuration of a hydraulic shock absorber of each suspension 100 in accordance with Embodiment 1. As illustrated in FIG. 2, the suspension 100 includes a cylinder 101, a piston 102 slidably provided inside the cylinder 101, and a piston rod 103 fixed to the piston 102. The cylinder 101 is partitioned by the piston 102 into an upper chamber 101a and a lower chamber 101b. The upper chamber 101a and the lower chamber 101b are filled with a hydraulic fluid.

As illustrated in FIG. 2, the suspension 100 includes a communication passage 104 which allows the upper chamber 101a and the lower chamber 101b to communicate with each other, and a solenoid valve 105 which adjusts a damping force of the suspension 100 is provided on the communication passage 104.

The solenoid valve 105 includes a solenoid 105a and a valve 105b which is driven by the solenoid 105a so as to change a cross-sectional area of a flow channel of the communication passage 104.

The solenoid 105a inserts and retracts the valve 105b in accordance with a suspension control amount supplied from the ECU 600. This causes a change in the cross-sectional area of the flow channel of the communication passage 104 and causes a change in the damping force of the suspension 100, accordingly.

Note that the suspension 100 may be an active suspension or an air suspension.

ECU 600

Figure 3:
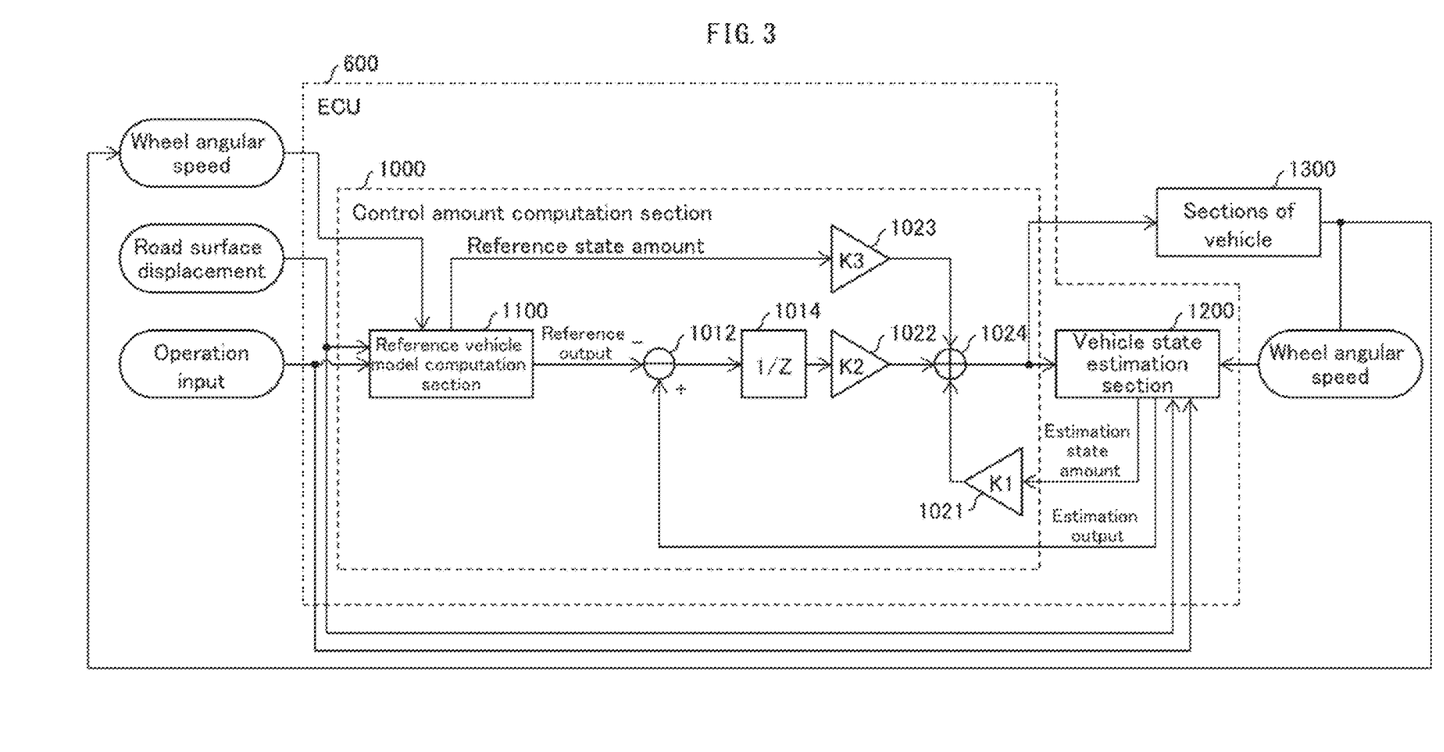
FIG. 3 is a block diagram schematically illustrating a configuration of an ECU in accordance with Embodiment 1 of the present invention.

The following description will discuss details of the ECU 600 with reference to other drawings. FIG. 3 is a view schematically illustrating a configuration of the ECU 600.

Figure 4:
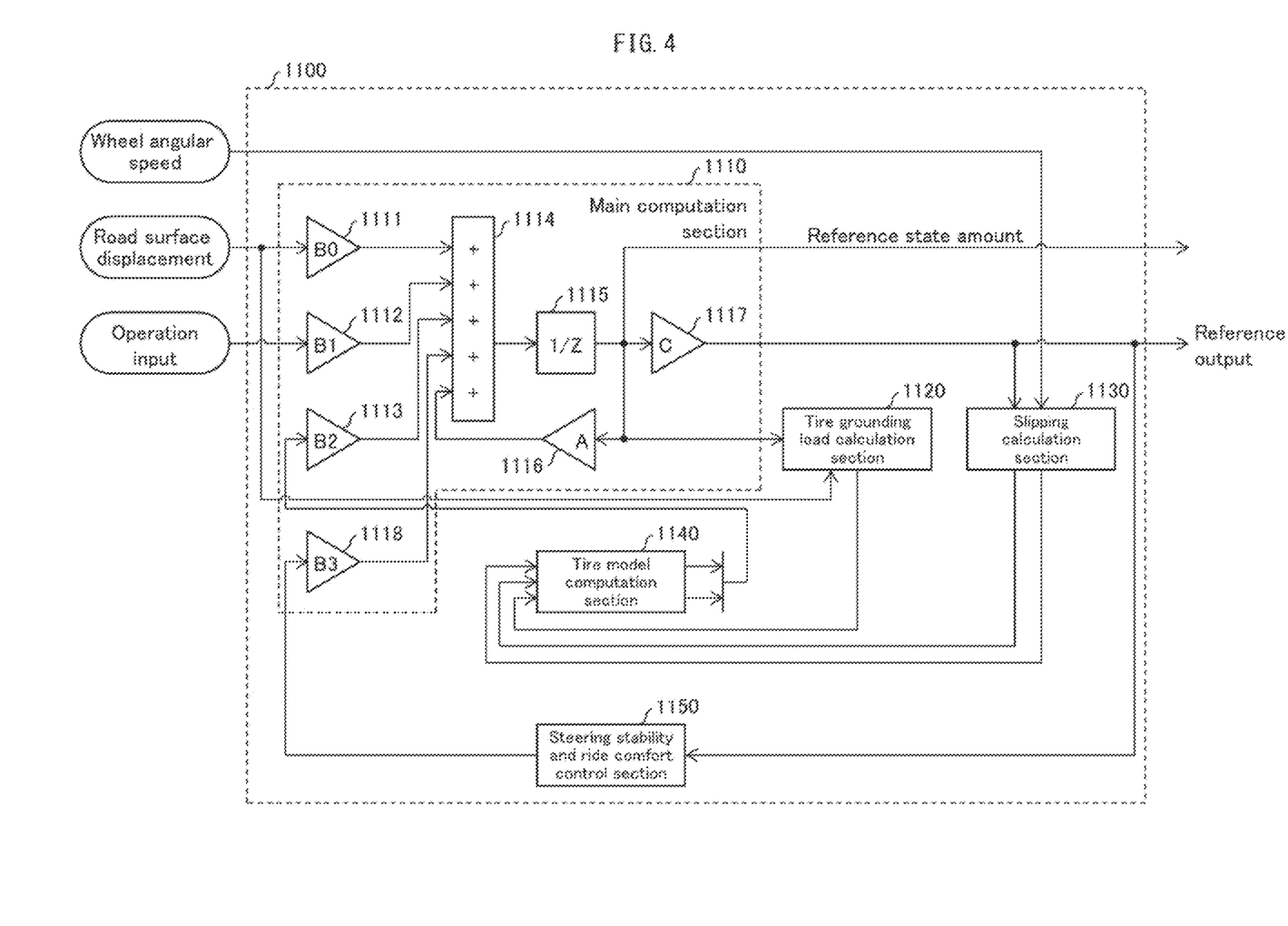
FIG. 4 is a block diagram illustrating an example of a configuration of a reference vehicle model computation section in accordance with Embodiment 1 of the present invention.

As illustrated in FIG. 3, the ECU 600 includes a control amount computation section 1000 and a vehicle state estimation section (vehicle state estimation device) 1200. Note that sections 1300 of the vehicle illustrated in FIG. 4 represent (i) sections of the vehicle 900 that are controlled with reference to a result of computation carried out by the control amount computation section 1000 and (ii) various sensors for obtaining a state amount of the vehicle 900. Examples of the sections to be controlled of the vehicle 900 encompass the suspensions 100 and the torque application section 460, and examples of the various sensors encompass the yaw rate sensor 350.

Control Amount Computation Section

As illustrated in FIG. 3, the control amount computation section 1000 includes a reference vehicle model computation section 1100, a subtractor 1012, an integrator 1014, a first amplifier 1021, a second amplifier 1022, a third amplifier 1023, and an adder 1024.

The reference vehicle model computation section 1100 carries out computation with respect to an input value with use of a vehicle model for reference and supplies a reference output, which is a result of the computation, to the subtractor 1012. Further, the reference vehicle model computation section 1100 supplies various state amounts that are subjects of the computation to the third amplifier 1023, each as reference state amounts. The reference output outputted from the reference vehicle model computation section 1100 serves as a target value in vehicle control. Note that the reference output constitutes at least part of the various state amounts that are subjects of the computation.

Examples of an input to the reference vehicle model computation section 1100 encompass a road surface displacement and an operation input, as illustrated in FIG. 3. Note that the operation input includes a steering angle of the steering member 410.

Examples of the reference state amount supplied from the reference vehicle model computation section 1100 to the subtractor 1012 and the third amplifier 1023 encompass at least one of sprung vertical speed (i.e., vertical speed of a sprung portion) w of the vehicle body 200, roll rate p of the vehicle body 200, pitch rate q of the vehicle body 200, and yaw rate r of the vehicle body 200. Note that a more specific configuration of the reference vehicle model computation section 1100 will be described later.

The subtractor 1012 obtains an estimation output from the vehicle state estimation section 1200 (described later), subtracts, from the estimation output thus obtained, the reference output outputted from the reference vehicle model computation section 1100, and supplies a result of subtraction thus carried out to the integrator 1014.

Examples of the estimation output and an estimation state amount, which are supplied from the vehicle state estimation section 1200 to the subtractor 1012 and the first amplifier 1021, respectively, encompass an estimated value of sprung vertical speed, an estimated value of roll rate, and an estimated value of pitch rate of the vehicle body 200, and the like.

The integrator 1014 integrates the result of the subtraction carried out by the subtractor 1012. A result of integration thus carried out is supplied to the second amplifier 1022.

The first amplifier 1021 amplifies, with use of an amplification coefficient K1, the estimation state amount supplied from the vehicle state estimation section 1200 and supplies a result of amplification thus carried out to the adder 1024.

The second amplifier 1022 amplifies, with use of an amplification coefficient K2, the result of the integration carried out by the integrator 1014 and supplies a result of amplification thus carried out to the adder 1024.

The third amplifier 1023 integrates, with use of an amplification coefficient K3, the reference state amount supplied from the reference vehicle model computation section 1100 and supplies a result of integration thus carried out to the adder 1024.

The adder 1024 adds the result of the amplification carried out by the first amplifier 1021, the result of the amplification carried out by the second amplifier 1022, and the result of the amplification carried out by the third amplifier 1023, and supplies a result of addition thus carried out to the vehicle state estimation section 1200 and the sections 1300 of the vehicle. The result of the addition carried out by the adder 1024 represents a result of computation carried out by the control amount computation section 1000.

Since the control amount computation section 1000 includes (i) the subtractor 1012 that subtracts the reference output, which is an output value outputted from the reference vehicle model computation section 1100, from the estimation output, which is an output value outputted from the vehicle state estimation section 1200, (ii) the integrator 1014 that integrates the result of the subtraction carried out by the subtractor 1012, (iii) the first amplifier 1021 that amplifies the estimation state amount, which is a subject of computation carried out by the vehicle state estimation device 1200, (iv) the second amplifier 1022 that amplifies the result of the integration carried out by the integrator 1014, (v) the third amplifier 1023 that amplifies the reference state amount, which is a subject of computation carried out by the reference vehicle model computation section 1100, and (vi) the adder 1024 that adds the result of the amplification carried out by the first amplifier 1021, the result of the amplification carried out by the second amplifier 1022, and the result of the amplification carried out by the third amplifier 1023, it is possible to follow a reference model characteristic without deviation.

Further, since the control amount computation section 1000 includes the integrator 1014, it is possible to follow the reference model characteristic without deviation.

Reference Vehicle Model Computation Section

The following description will discuss in detail a configuration of the reference vehicle model computation section 1100 with reference to FIG. 4. FIG. 4 is a block diagram illustrating a configuration of the reference vehicle model computation section 1100. As illustrated in FIG. 4, the reference vehicle model computation section 1100 includes a main computation section 1110, a tire grounding load calculation section 1120, a slipping calculation section 1130, and a tire model computation section 1140.

Main Computation Section

The main computation section 1110 refers to one or more input values and carries out linear computation for a state amount related to a state of the vehicle, so as to calculate one or more output values.

As illustrated in FIG. 4, the main computation section 1110 includes a first input matrix computation section 1111, a second input matrix computation section 1112, a third input matrix computation section 1113, a fourth input matrix computation section 1118, an adder 1114, an integrator 1115, a system matrix computation section 1116, and an observation matrix computation section 1117. Note that the first input matrix computation section 1111, the second input matrix computation section 1112, the third input matrix computation section 1113, and the fourth input matrix computation section 1118 may be referred to as a first computation section.

To the first input matrix computation section 1111, which carries out computation regarding an input matrix B0 with respect to a ground surface input, road surface displacements (vertical displacements) $z_{0fl}$, $z_{0fr}$, $z_{0rl}$, and $z_{0rr}$ are inputted, for example. Note that the subscripts "fl", "fr", "rl", and "rr" indicate that the road surface displacement is related to the left front wheel, the right front wheel, the left rear wheel, and the right rear wheel, respectively. Hereinafter, $z_{0fl}$, $z_{0fr}$, $z_{0rl}$, and $z_{0rr}$ may be collectively indicated as $z_{0fl}$ through $z_{0rr}$. The same also applies to other parameters.

The first input matrix computation section 1111 carries out computation using the input matrix B0 with respect to the road surface displacements $z_{0rr}$ through $z_{0rr}$ inputted, and supplies a result of the computation thus carried out to the adder 1114.

The second input matrix computation section 1112, which carries out computation regarding an input matrix B1 with respect to an operation amount, carries out computation using the input matrix B1, for example, with respect to a steering angle of the steering member 410 and supplies a result of the computation thus carried out to the adder 1114.

The third input matrix computation section 1113, which carries out computation regarding an input matrix B2 with respect to a tire front and rear force and a tire lateral force, carries out computation using the input matrix B2, with respect to tire front and rear forces $F_{x0fl}$ through $F_{x0rr}$ of the respective wheels and tire lateral forces $F_{y0fl}$ through $F_{y0rr}$ of the respective wheels, the tire front and rear forces $F_{x0fl}$ through $F_{x0rr}$ and the tire lateral forces $F_{y0fl}$ through $F_{y0rr}$ being supplied from the tire model computation section 1140 (described later). The third input matrix computation section 1113 supplies a result of the computation thus carried out to the adder 1114.

The fourth input matrix computation section 1118, which carries out computation regarding an input matrix B3 with respect to a force caused by a variable dumper or an active suspension, carries out computation using the input matrix B3, with respect to an output from a steering stability and ride comfort control section 1150 (described later) and supplies a result of the computation thus carried out to the adder 1114.

The adder 1114 adds respective outputs from the first input matrix computation section 1111, the second input matrix computation section 1112, the third input matrix computation section 1113, the fourth input matrix computation section 1118, and the system matrix computation section 1116 (described later) and supplies a result of addition thus carried out to the integrator 1115.

The integrator 1115 integrates the result of the addition supplied from the adder 1114. A result of integration thus carried out by the integrator 1115 is supplied to the third amplifier 1023 described above, the system matrix computation section 1116, and the observation matrix computation section 1117.

The system matrix computation section (second computation section) 1116 carries out computation using a system matrix A with respect to the result of the integration carried out by the integrator 1115 and supplies a result of the computation thus carried out to the adder 1114.

The observation matrix computation section (third computation section) 1117 carries out computation using an observation matrix C with respect to the result of the integration carried out by the integrator 1115 and supplies a result of the computation thus carried out to the above-described subtractor 1012 as the reference output. The result of the computation carried out with use of the observation matrix C is also supplied to the slipping calculation section 1130.

Note that the computation carried out by each section of the main computation section 1110 is carried out as linear computation. Accordingly, the main computation section 1110 having the configuration above makes it possible to suitably carry out linear computation with respect to a state amount related to a state of the vehicle with reference to one or more input values.

Further, an input to the main computation section 1110 is not limited to the above-described examples. For example, it is possible to employ a configuration in which at least one of:
steering torque;
wheel angular speed of each wheel;
actual rudder angle of each wheel; and
driving torque of each wheel
is inputted to the main computation section 1110 and the main computation section 1110 carries out linear computation with respect to an input value(s) of the at least one of these inputs. In such a case, for example, the main computation section 1110 may include a vehicle model switching section that switches between vehicle models respectively represented by the system matrix A, the input matrix B, and the observation matrix C, and the vehicle model switching section may switch between the vehicle models with reference to the above input(s).

It is also possible to employ a configuration in which the vehicle 900 includes a load detection sensor and a value detected by the load detection sensor is inputted to the main computation section 1110. In such a case, for example, the main computation section 1110 may include a vehicle model switching section that switches between vehicle models respectively represented by the system matrix A, the input matrix B, and the observation matrix C depending on each load, and the vehicle model switching section may switch between the vehicle models in accordance with the value detected by the load detection sensor.

The input(s) to the main computation section 1110 may further include at least one of:
yaw rate;
front and rear G;
lateral G;
braking pressure;
VSA flag, TCS flag, and ABS flag;
engine torque; and
engine RPM.

In such a case, for example, the main computation section 1110 may include a vehicle model switching section that switches between vehicle models represented by the system matrix A, the input matrix B, and the observation matrix C, respectively, and the vehicle model switching section may switch between the vehicle models with reference to the above input(s).

Example of State Amount which is Subject of Computation by Main Computation Section The state amount which is a subject of computation by the main computation section 1110 is, for example, represented as follows as a state amount vector x.

$$x = [u, v, w, p, q, r, \varphi, \theta, \psi, DampSt_{fl}, DampSt_{fr}, DampSt_{rl},$$
$$DampSt_{rr},$$

$$z_{1flm}, z_{1frm}, z_{1rlm}, z_{1rrm}, w_{1flm}, w_{1frm}, w_{1rlm}, w_{1rrm}, \delta, d\delta]^T \quad \text{[Math. 1]}$$

where:
u, v, and w are respectively x-, y-, and z-direction components of a sprung speed of the vehicle body 200; and
p, q, and r are respectively x-, y-, and z-direction components of a sprung angular speed of the vehicle body 200, that is, a roll rate, a pitch rate, and a yaw rate. Further, $$\varphi, \theta, \psi \quad \text{[Math. 2]}$$

are respectively the three components of Euler angles;
$DampSt_{fl}$ through $DampSt_{rr}$ are damper strokes of the respective wheels;
$z_{1flm}$ through $z_{1rrm}$ are unsprung displacements (displacements of unsprung portions) of the respective wheels;
$w_{1flm}$ through $w_{1rrm}$ are unsprung speeds (speeds of unsprung portions) of the respective wheels;
$\delta$ is an actual rudder angle; and
$d\delta$ is an actual rudder angle speed.

Note here that an x-direction indicates a traveling direction (front and rear direction) of the vehicle 900, a z-direction indicates a vertical direction and a y-direction indicates a direction (lateral direction) perpendicular to both the x-direction and the z-direction.

Note that the actual rudder angle $\delta$ and the actual rudder angle speed $d\delta$ may be set individually for each wheel 300.

Example of State Amount Outputted from Main Computation Section

A type of the reference output outputted from the main computation section 1110 is determined depending on how the observation matrix C is selected. For example, in a case where the reference output outputted from the main computation section 1110 is represented as a specific state amount vector y, the specific state amount vector y includes sprung vertical speed w, roll rate p, and pitch rate q as shown below.

$$y = [w, p, q, \text{etc}]^T \quad \text{[Math. 3]}$$

Thus, the reference output outputted from the main computation section 1110 is a physical quantity that can be represented with use of one or a combination of the state amounts included in the above-described state amount vector x.

Example of Motion Equation which is Subject of Computation by Main Computation Section A motion equation which is a subject of computation by the main computation section 1110 is, for example, as follows.

Motion equations related to sprung translational and rotational motions:

$$F_x = m\dot{u} + m(qw - rv) \quad M_x = I_x\dot{p} - I_{zx}\dot{r} - (I_y - I_z)qr - I_{xx}pq$$

$$F_y = m\dot{v} + m(ru - pw) \quad M_y = I_y\dot{q} - (I_z - I_x)rp - I_{xx}(r^2 - p^2)$$

$$F_x = m\dot{w} + (pv - qu) \quad M_z = I_z\dot{r} - I_{zx}\dot{p} - (I_x - I_y)pq + I_{xx}qr \quad \text{[Math. 4]}$$

Motion equations related to Euler angles:

$$\dot{\varphi} = p + q \tan\theta \sin\varphi + r \tan\theta \cos\varphi$$

$$\dot{\theta} = q \cos\varphi - r \sin\varphi$$

$$\dot{\psi} = r \cos\varphi/\cos\theta + q \sin\varphi/\cos\theta \quad \text{[Math. 5]}$$

Motion equations related to unsprung vertical motion:

$$m_1 \dot{w}_{1flm} = -F_{zflm} - k_{1f}(z_{1flm} - z_{0fl})$$

$$m_1 \dot{w}_{1rlm} = -F_{zrlm} - k_{1r}(z_{qrlm} - z_{0rl})$$

$$m_1 \dot{w}_{1frm} = -F_{zfrm} - k_{1f}(z_{1frm} - z_{0fr})$$

$$m_1 \dot{w}_{1rrm} = -F_{zrrm} - k_{1r}(z_{1rrm} - z_{0rr}) \quad \text{[Math. 6]}$$

Motion equation related to actual rudder:

$$d\delta = \frac{1}{I_s}(-C_s d\delta - K_s(\delta - \alpha)) \quad \text{[Math. 7]}$$

In the motion equations above, m is a sprung mass of the vehicle (i.e., a mass of the vehicle body 200), $F_x$, $F_y$, and $F_z$ are respectively x-, y-, and z-direction forces exerted on a sprung portion of the vehicle (i.e., on the vehicle body 200), $M_x$, $M_y$, and $M_z$ are respectively x-, y-, and z-axial moments exerted on the sprung portion of the vehicle, $I_x$, $I_y$, and $I_z$ are respectively x-, y-, and z-axial inertia moments exerted on the sprung portion of the vehicle, and $I_{zx}$ is a product of inertia of the y-axis.

Further, $F_{zflm}$ etc. are suspension forces of the respective wheels, and $m_1$ is an unsprung mass. Further, the dot "." written above each physical quantity represents a time derivative.

Further, $\alpha$ is a steering angle, $I_s$ is a wheel inertia moment about an axis of a kingpin, $C_s$ is an equivalent viscous friction coefficient of the kingpin, and $K_s$ is an equivalent elastic coefficient about the axis of the kingpin.

Apart from the above motion equations, a motion equation related to a rotational motion of a wheel is also a subject of computation carried out by the main computation section 1110. Further, there are a plurality of relational expressions (e.g., relational expressions that relate a physical quantity of a sprung portion and a physical quantity of an upsprung portion to each other) that relate physical quantities present in those motion equations to each other. The motion equations are solved along with these relational expressions.

Linearization of Motion Equations and Implementation to Main Computation Section The above-described motion equations are, in general, nonlinear and can be expressed as follows.

$$\dot{x} = f(x) + g(x)U \quad \text{[Math. 8]}$$

where x is a vector indicative of a state amount, and f(x) and g(x) are functions of x and can be expressed as vectors.

In a case where a Taylor expansion of the above nonlinear motion equation is obtained and an initial value of each state amount is substituted into a Jacobian matrix, a matrix A as shown below is yielded. Matrices B and C as shown below are yielded in a similar fashion.

Consequently, linearized motion equations are expressed in a state space as follows.

$$\dot{x} = Ax + Bu$$

$$y = Cx \quad \text{[Math. 9]}$$

where the matrix A corresponds to the above-described system matrix A, the matrix B corresponds to the above-described input matrices B0, B1, B2, and B3, and the matrix C corresponds to the above-described observation matrix C.

It is thus shown from the above description that the main computation section 1110 illustrated in FIG. 4 is configured to linearly compute a motion equation that is a subject of computation.

Other Configurations of Reference Vehicle Model Computation Section

The following description will discuss configurations of the reference vehicle model computation section 1100 other than the main computation section 1110.

The slipping calculation section 1130, with reference to a result of computation carried out by the observation matrix computation section 1117 and wheel angular speeds con through co, of the respective wheels detected by the wheel speed sensors 320, calculates slip ratios $s_{fl}$ through $s_{rr}$ of the respective wheels and calculates, as a result of computation carried out by the observation matrix computation section 1117, slip angles $\beta_{fl}$ through $\beta_{rr}$ of the respective wheels. The slipping calculation section 1130 supplies results of calculations thus carried out to the tire model computation section 1140.

The tire grounding load calculation section 1120 calculates grounding loads $F_{z0fl}$ through $F_{z0rr}$ of the respective wheels on the basis of the unsprung displacements $z_{1flm}$ through $z_{1frrm}$ of the respective wheels obtained through the computation by the integrator 1115 and the road surface displacements $z_{0fl}$ through $z_{0rr}$ of the respective wheels, and supplies a result of calculation thus carried out to the tire model computation section 1140.

The tire model computation section 1140 carries out nonlinear computation with direct or indirect reference to at least part of a result of computation carried out by the main computation section 1110. In the example illustrated in FIG. 4, the tire model computation section 1140 carries out the nonlinear computation with reference to the slip ratios $s_{fl}$ through $s_{rr}$ of the respective wheels obtained from the computation carried out by the observation matrix computation section 1117, the slip angles $\beta_{fl}$ through $\beta_{rr}$ of the respective wheels, and the grounding loads $F_{z0fl}$ through $F_{z0rr}$ of the respective wheels computed by the tire grounding load calculation section 1120. That is, in the example illustrated in FIG. 4, the tire model computation section 1140 carries out the nonlinear computation with indirect reference to at least part of a result of computation carried out by the main computation section 1110.

More specifically, the tire model computation section 1140 calculates the tire front and rear forces $F_{x0fl}$ through $F_{x0rr}$ of the respective wheels and the tire lateral forces $F_{y0fl}$ through $F_{y0rr}$ of the respective wheels, with use of an arithmetic expression related to a tire model and with reference to the slip ratios $s_{fl}$ through $s_{rr}$ of the respective wheels, the slip angles $\beta_{fl}$ through $\beta_{rr}$ of the respective wheels, and the grounding loads $F_{z0fl}$ through $F_{z0rr}$ of the respective wheels. A specific example of the arithmetic expression used by the tire model computation section 1140 may be $$F_{Px0fl} = D_{xfl} \cdot \sin[C_{xfl} \cdot \tan^{-1}\{B_{xfl} \cdot s_{xfl} - E_{xfl}(B_{xfl} \cdot s_{xfl} - \tan^{-1}(B_{xfl} \cdot s_{xfl}))\}] + S_{xfl}$$

$$F_{Py0fl} = D_{yfl} \cdot \sin[C_{yfl} \cdot \tan^{-1}\{B_{yfl} \cdot s_{yfl} - E_{yfl}(B_{yfl} \cdot s_{yfl} - \tan^{-1}(B_{xfl} \cdot s_{yfl}))\}] + S_{xfl}$$

$$F_{x0fl} = F_{Px0fl} \cdot G_{x\beta fl}$$

$$F_{y0fl} = F_{Py0fl} \cdot G_{yfl} + S_{yfl}$$

$$s_{xfl} = s_{fl} + S_{Hxfl}$$

$$\beta_{yfl} = \beta_{fl} + S_{Hyfl} \qquad \text{[Math. 10]}$$

but Embodiment 1 is not limited to these. Note that in a first expression, $F_{Px0fl}$ indicates a tire front and rear force of the left front wheel in a case where the vehicle is moving straight forward. Each variable is a value that depends on a characteristic of the tire and/or on $F_{z0fl}$. In a second expression, $F_{Py0fl}$ indicates a tire lateral force in a case where no tire front and rear force is involved.

Note that the tire model computation section 1140, which carries out nonlinear computation with direct or indirect reference to at least part of a result of computation carried out by the main computation section 1110, may be regarded as a tire force estimation device that calculates the tire front and rear forces $F_{x0fl}$ through $F_{x0rr}$ of the respective wheels and the tire lateral forces $F_{y0fl}$ through $F_{y0rr}$ of the respective wheels.

As described above, in the reference vehicle model computation section 1100 in accordance with Embodiment 1, the main computation section 1110 carries out linear computation and the tire model computation section 1140 carries out nonlinear computation with direct or indirect reference to at least part of a result of computation carried out by the main computation section 1110. By thus employing a configuration in which a linear computation section and a nonlinear computation section are provided separately from each other, it is possible to suitably carry out computation with respect to a state amount with use of a vehicle model.

Further, since the tire model computation section 1140 carries out nonlinear computation based on a tire model, nonlinear computation can be suitably separated from linear computation.

Further, as described above, the third input matrix computation section 1113 takes in, as an input, a result of nonlinear computation carried out by the tire model computation section 1140. This makes it possible to suitably take the result of the nonlinear computation into linear computation carried out by the main computation section 1110. This allows the main computation section 1110 to achieve highly accurate computation while carrying out linear computation.

Steering Stability and Ride Comfort Control Section 1150

The steering stability and ride comfort control section 1150 determines a control amount for controlling each section of a reference vehicle model and influences, in order to supply the control amount to the sections, the reference output outputted from the observation matrix computation section 1117. An output from the steering stability and ride comfort control section 1150 is supplied to the fourth input matrix computation section 1118, and computation is carried out with use of the input matrix B3.

For example, the steering stability and ride comfort control section 1150 carries out (i) processes of skyhook control, roll attitude control, pitch attitude control, and unsprung portion control and (ii) a process of selecting a control amount.

Note that the skyhook control means a ride comfort control (damping control) for improving ride comfort by suppressing oscillation of the reference vehicle model caused at the time of driving over irregular road surfaces.

In the skyhook control, a skyhook target control amount is determined, for example, with reference to a sprung speed of a reference vehicle model, a four-wheel stroke speed, a pitch rate, and a roll rate, and a result thus determined is regarded as a subject of the process of selecting a control amount.

In the roll attitude control, target control amounts are calculated with reference to a roll rate during steering and a rudder angle, and a result of calculation thus carried out is regarded as a subject of the process of selecting a control amount.

In the pitch attitude control, pitch control is carried out with reference to a pitch rate during acceleration so as to calculate a pitch target control amount, and a result of calculation thus carried out is regarded as a subject of the process of selecting a control amount.

In the unsprung portion control, damping control of an unsprung portion of the vehicle is carried out with reference to a four-wheel wheel speed so as to determine an unsprung-portion-damping target control amount, and a result thus determined is used as a subject of the process of selecting a control amount.

In the process of selecting a control amount, a target control amount having the highest value may be selected and outputted from among the skyhook target control amount, the target control amounts calculated in the roll attitude control, the pitch target control amount, and the unsprung-portion-damping target control amount.

Vehicle State Estimation Section

The following description will discuss details of the vehicle state estimation section 1200 with reference to another drawing.

The vehicle state estimation section 1200 carries out computation with respect to an input value with use of a vehicle model for estimation and supplies an estimation output, which is a result of the computation, to the subtractor 1012. Further, the vehicle state estimation section 1200 supplies various state amounts that are subjects of the computation to the first amplifier 1021. The estimation output outputted from the vehicle state estimation section 1200 serves as an estimated value of each physical quantity related to the vehicle.

Figure 5:
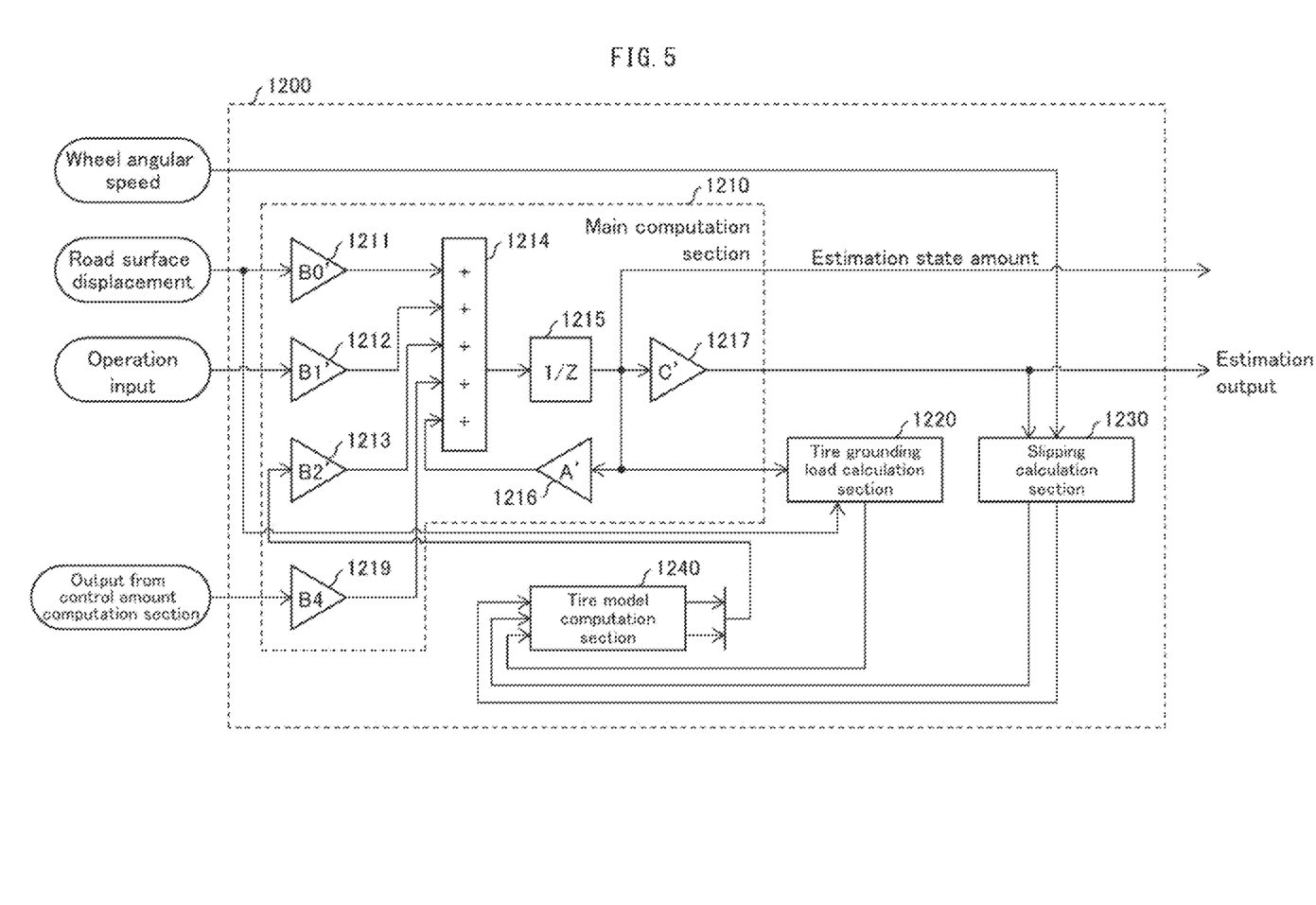
FIG. 5 is a block diagram illustrating an example of a configuration of a vehicle state estimation section in accordance with Embodiment 1 of the present invention.

FIG. 5 is a block diagram illustrating an example of a configuration of the vehicle state estimation section 1200. As illustrated in FIG. 5, the vehicle state estimation section 1200 includes a main computation section 1210, a tire grounding load calculation section 1220, a slipping calculation section 1230, and a tire model computation section 1240.

Main Computation Section

The main computation section 1210 refers to one or more input values and carries out linear computation for a state amount related to a state of the vehicle, so as to calculate one or more output values.

As illustrated in FIG. 5, the main computation section 1210 includes a first input matrix computation section 1211, a second input matrix computation section 1212, a third input matrix computation section 1213, a fifth input matrix computation section 1219, an adder 1214, an integrator 1215, a system matrix computation section 1216, and an observation matrix computation section 1217. Note that the first input matrix computation section 1211, the second input matrix computation section 1212, the third input matrix computation section 1213, and the fifth input matrix computation section 1219 may be referred to as a first computation section.

To the first input matrix computation section 1211, which carries out computation regarding an input matrix B0' with respect to a ground surface input, road surface displacements (vertical displacements) $z_{0fl}$, $z_{0fr}$, $z_{0r1}$, and $z_{0rr}$ are inputted, for example.

The first input matrix computation section 1211 carries out computation using the input matrix B0' with respect to the road surface displacements $z_{0fl}$ through $z_{0rr}$ inputted, and supplies a result of the computation thus carried out to the adder 1214. Note that the input matrix B0' used in the computation carried out by the first input matrix computation section 1211 may be the same as or different from the input matrix B0 used in the computation carried out by the first input matrix computation section 1111.

The second input matrix computation section 1212, which carries out computation regarding an input matrix B1' with respect to an operation amount, carries out computation using the input matrix B1', for example, with respect to a steering angle of the steering member 410 and supplies a result of the computation thus carried out to the adder 1214. Note that the input matrix B1' used in the computation carried out by the second input matrix computation section 1212 may be the same as or different from the input matrix B1 used in the computation carried out by the second input matrix computation section 1112.

The third input matrix computation section 1213, which carries out computation regarding an input matrix B2' with respect to a tire front and rear force and a tire lateral force, carries out computation using the input matrix B2', for example, with respect to tire front and rear forces $F_{x0fl}$ through $F_{x0rr}$ of the respective wheels and tire lateral forces $F_{y0fl}$ through $F_{y0rr}$ of the respective wheels, the tire front and rear forces $F_{x0fl}$ through $F_{x0rr}$ and the tire lateral forces $F_{y0fl}$ through $F_{y0rr}$ being supplied from the tire model computation section 1240 (described later). The third input matrix computation section 1213 supplies a result of the computation thus carried out to the adder 1214. Note that the input matrix B2' used in the computation carried out by the third input matrix computation section 1213 may be the same as or different from the input matrix B2 used in the computation carried out by the third input matrix computation section 1113.

To the fifth input matrix computation section 1219, which carries out computation regarding an input matrix B4 with respect to an output from the control amount computation section 1000, an output from the control amount computation section 1000 is inputted. The fifth input matrix computation section 1219 carries out computation using the input matrix B4 with respect to the output from the control amount computation section 1000 and supplies a result of the computation thus carried out to the adder 1214.

The adder 1214 adds respective outputs from the first input matrix computation section 1211, the second input matrix computation section 1212, the third input matrix computation section 1213, the fifth input matrix computation section 1219, and the system matrix computation section 1216 (described later) and supplies a result of addition thus carried out to the integrator 1215.

The integrator 1215 integrates the result of the addition supplied from the adder 1214. A result of integration thus carried out by the integrator 1215 is outputted as an estimation state amount and supplied to the system matrix computation section 1216 and the observation matrix computation section 1217.

The system matrix computation section (second computation section) 1216 carries out computation using a system matrix A' with respect to the result of the integration carried out by the integrator 1215 and supplies a result of the computation thus carried out to the adder 1214. Note that the system matrix A' may be the same as or different from the system matrix A used in the computation carried out by the system matrix computation section 1116.

The observation matrix computation section (third computation section) 1217 carries out computation using an observation matrix C' with respect to the result of the integration carried out by the integrator 1215 and supplies a result of the computation thus carried out to the above-described subtractor 1012 as the estimation output. The result of the computation carried out with use of the observation matrix C' is also supplied to the slipping calculation section 1230. Note that the observation matrix C' may be the same as or different from the observation matrix C used in the computation carried out by the observation matrix computation section 1117.

Note that the computation carried out by each section of the main computation section 1210 is carried out as linear computation. Accordingly, the main computation section 1210 having the configuration above makes it possible to suitably carry out linear computation with respect to a state amount related to a state of the vehicle with reference to one or more input values.

Further, as with the main computation section 1110, an input to the main computation section 1210 is not limited to the above-described examples. For example, it is possible to employ a configuration in which at least one of:
  steering torque;
  wheel angular speed of each wheel;
  actual rudder angle of each wheel; and
  driving torque of each wheel
is inputted to the main computation section 1210 and the main computation section 1210 carries out linear computation with respect to an input value(s) of the at least one of these inputs. In such a case, for example, the main computation section 1210 may include a vehicle model switching section that switches between vehicle models represented by the system matrix A', the input matrix B', and the observation matrix C', respectively, and the vehicle model switching section may switch between the vehicle models with reference to the above input(s).

It is also possible to employ a configuration in which the vehicle 900 includes a load detection sensor and a value detected by the load detection sensor is inputted to the main computation section 1210. In such a case, for example, the main computation section 1210 may include a vehicle model switching section that switches between vehicle models respectively represented by the system matrix A', the input matrix B', and the observation matrix C' depending on each load, and the vehicle model switching section may switch between the vehicle models in accordance with the value detected by the load detection sensor.

The input(s) to the main computation section 1210 may further include at least one of:
  yaw rate;
  front and rear G;
  lateral G;
  braking pressure;
  VSA flag, TCS flag, and ABS flag;
  engine torque; and
  engine RPM.

In such a case, for example, the main computation section 1210 may include a vehicle model switching section that switches between vehicle models represented by the system matrix A', the input matrix B', and the observation matrix C', respectively, and the vehicle model switching section may switch between the vehicle models with reference to the above input(s).

Example of State Amount which is Subject of Computation by Main Computation Section A state amount that is a subject of computation carried out by the main computation section 1210 is similar to a state amount that is a subject of computation carried out by the main computation section 1110, and will not be discussed in detail herein. Note that the reference output outputted from the main computation section 1210 is a physical quantity that can be represented with use of one or a combination of the state amounts included in the above-described state amount vector x, as with the case of the main computation section 1110.

Linearization of Motion Equations and Implementation to Main Computation Section Linearization of motion equations and implementation of the motion equations to the main computation section 1210 are similar to those discussed in the descriptions of implementation to the main computation section 1110, and will not be discussed in detail herein. Note that the matrices A and C in the linearized motion equations discussed in the descriptions of implementation to the main computation section 1110 correspond to the matrices A' and C' in the main computation section 1210, and the matrix B in the linearized motion equation corresponds to the matrices B0', B1', B2', and B4 in the main computation section 1210.

It is thus shown from the above description that the main computation section 1210 illustrated in FIG. 5 is configured to linearly compute a motion equation that is a subject of computation.

Other Configurations of Vehicle State Estimation Section

The following description will discuss configurations of the vehicle state estimation section 1200 other than the main computation section 1210.

The slipping calculation section 1230, with reference to a result of computation carried out by the observation matrix computation section 1217 and wheel angular speeds $\omega_{fl}$ through $\omega_{rr}$ of the respective wheels detected by the wheel speed sensors 320, calculates slip ratios $s_{fl}$ through $s_{rr}$ of the respective wheels and calculates, as a result of computation carried out by the observation matrix computation section 1217, slip angles $\beta_{fl}$ through $\beta_{rr}$ of the respective wheels. The slipping calculation section 1230 supplies results of calculations thus carried out to the tire model computation section 1140.

The tire grounding load calculation section 1220 calculates grounding loads $F_{z0fl}$ through $F_{z0rr}$ of the respective wheels on the basis of the unsprung displacements $z_{1flm}$ through $z_{1frrm}$ of the respective wheels obtained through the computation by the integrator 1215 and the road surface displacements $z_{0fl}$ through $z_{0rr}$ of the respective wheels, and supplies a result of calculation thus carried out to the tire model computation section 1240.

The tire model computation section 1240 carries out nonlinear computation with direct or indirect reference to at least part of a result of computation carried out by the main computation section 1210. In the example illustrated in FIG. 5, the tire model computation section 1240 carries out the nonlinear computation with reference to the slip ratios $s_{fl}$ through $s_{rr}$ of the respective wheels obtained from the computation carried out by the observation matrix computation section 1217, the slip angles $\beta_{fl}$ through $\beta_{rr}$ of the respective wheels obtained from the computation carried out by the observation matrix computation section 1217, and the grounding loads $F_{z0fl}$ through $F_{z0rr}$ of the respective wheels computed by the tire grounding load calculation section 1220. That is, in the example illustrated in FIG. 5, the tire model computation section 1240 carries out the nonlinear computation with indirect reference to at least part of a result of computation carried out by the main computation section 1210.

Details of a computation process carried out by the tire model computation section 1240 are similar to those of the tire model computation section 1140, and will not be discussed in detail herein.

Note that the tire model computation section 1240, which carries out nonlinear computation with direct or indirect reference to at least part of a result of computation carried out by the main computation section 1210, may be regarded as a tire force estimation device that calculates the tire front and rear forces $F_{x0fl}$ through $F_{x0rr}$ of the respective wheels and the tire lateral forces $F_{y0fl}$ through $F_{x0rr}$ of the respective wheels.

As described above, in the vehicle state estimation section 1200 in accordance with Embodiment 1, the main computation section 1210 carries out linear computation and the tire model computation section 1240 carries out nonlinear computation with direct or indirect reference to at least part of a result of computation carried out by the main computation section 1210. By thus employing a configuration in which a linear computation section and a nonlinear computation section are provided separately from each other, it is possible to suitably carry out computation with respect to a state amount with use of a vehicle model.

Further, since the tire model computation section 1240 carries out nonlinear computation based on a tire model, nonlinear computation can be suitably separated from linear computation.

Further, as described above, the third input matrix computation section 1213 takes in, as an input, a result of nonlinear computation carried out by the tire model computation section 1240. This makes it possible to suitably take the result of the nonlinear computation into linear computation carried out by the main computation section 1210. This allows the main computation section 1210 to achieve highly accurate computation while carrying out linear computation.

Software Implementation Example

Control blocks of the ECU 600 (particularly, the control amount computation section 1000 and the vehicle state estimation section 1200) can be realized by a logic circuit (hardware) provided in an integrated circuit (IC chip) or the like or can be alternatively realized by software as executed by a central processing unit (CPU).

In the latter case, the ECU 600 includes a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 100 suspension
200 vehicle body
600 ECU (control device, suspension control device, suspension control section)
1000 control amount computation section
1012 subtractor
1014 integrator
1021 first amplifier
1022 second amplifier
1023 third amplifier
1024 adder
1100 reference vehicle model computation section
1110 main computation section
1111 first input matrix computation section
1112 second input matrix computation section
1113 third input matrix computation section
1114 adder
1115 integrator
1116 system matrix computation section
1117 observation matrix computation section
1140 tire model computation section
1200 vehicle state estimation section (vehicle state estimation device)
1210 main computation section (linear computation section)
1211 first input matrix computation section (first computation section)
1212 second input matrix computation section (first computation section)
1213 third input matrix computation section (first computation section)
1214 adder
1215 integrator
1216 system matrix computation section (second computation section)
1217 observation matrix computation section (third computation section)
1240 tire model computation section (nonlinear computation section)

The invention claimed is:

1. An in-vehicle vehicle state estimation device configured to estimate a state of a vehicle, the in-vehicle vehicle state estimation device comprising:
an electronic control unit (ECU) configured to:
carry out computation with use of a vehicle model, calculate one or more output values by carrying out, with reference to a plurality of input values, linear computation with respect to a state amount related to the state of the vehicle, wherein the state amount related to the state of the vehicle including a sprung speed of the vehicle, a sprung angular speed of the vehicle, and an unsprung speed of a wheel, carry out nonlinear computation with direct or indirect reference to at least part of a result of the linear computation, and
control a damping force of a suspension of the vehicle based on the linear and nonlinear computation.

2. The in-vehicle vehicle state estimation device as set forth in claim 1, wherein the ECU is configured to carry out the nonlinear computation on a basis of a tire model.

3. The in-vehicle vehicle state estimation device as set forth in claim 2, wherein the ECU is configured to carry out, with reference to a result of the nonlinear computation carried out by the ECU, the linear computation with respect to the state amount related to the state of the vehicle.

4. The in-vehicle vehicle state estimation device as set forth in claim 1, wherein the ECU is configured to carry out, with reference to a result of the nonlinear computation, the linear computation with respect to the state amount related to the state of the vehicle.

5. An in-vehicle vehicle state estimation device configured to estimate a state of a vehicle, the in-vehicle vehicle state estimation device comprising:
an electronic control unit (ECU) configured to:
carry out computation with use of a vehicle model, calculate one or more output values by carrying out, with reference to a plurality of input values, linear computation with respect to a state amount related to the state of the vehicle;
carry out nonlinear computation with direct or indirect reference to at least part of a result of the linear computation, the plurality of input values including a road surface displacement and an operation input, the one or more output values including a sprung vertical speed, a roll rate, and a pitch rate, and
control a damping force of a suspension of the vehicle based on the linear and nonlinear computation.

6. The in-vehicle vehicle state estimation device as set forth in claim 5, wherein the ECU is configured to carry out the nonlinear computation on the basis of a tire model.

7. The in-vehicle vehicle state estimation device as set forth in claim 6, wherein the ECU is configured to carry out, with reference to a result of the nonlinear computation carried out by the ECU, the linear computation with respect to the state amount related to the state of the vehicle.

8. The in-vehicle vehicle state estimation device as set forth in claim 5, wherein the ECU is configured to carry out, with reference to a result of the nonlinear computation carried out by the ECU, the linear computation with respect to the state amount related to the state of the vehicle.

9. A control device, comprising:
an electronic control unit (ECU) configured to:
estimate a state of a vehicle;
carry out computation related to a reference vehicle model;
carry out subtraction, from an estimation output that is an output value outputted from the ECU, of a reference output that is an output value outputted from the ECU;
carry out integration of a result of the subtraction;
carry out a first amplification of an estimation state amount that is a subject of computation;
carry out a second amplification of a result of the integration;
carry out a third amplification of a state amount that is a subject of the computation; and
carry out addition of a result of the first, second and third amplification
compute with use of a vehicle model, to calculate a plurality of output values by carrying out, with reference to a plurality of input values, linear computation with respect to a state amount related to the state of the vehicle; and to carry out nonlinear computation with direct or indirect reference to at least part of a result of the linear computation, the state amount related to the state of the vehicle including a sprung speed of the vehicle, a sprung angular speed of the vehicle, and an unsprung speed of a wheel; and control a damping force of a suspension of the vehicle based on the linear and nonlinear computation.

10. A control device, comprising:
an electronic control unit (ECU) configured to:
estimate a state of a vehicle;
to carry out computation related to a reference vehicle model;
  subtraction, from an estimation output that is an output value outputted from the ECU, of a reference output that is an output value outputted from the of the ECU;
  carry out integration of a result of the subtraction;
  carry out a first amplification of an estimation state amount that is a subject of computation carried out by the ECU;
  carry out a second amplification of a result of the integration;
  carry out a third amplification of a state amount that is a subject of the computation carried out by the ECU;
  carry out addition of a result of the first, second and third amplification compute with use of a vehicle model, to calculate a plurality of output values by carrying out, with reference to a plurality of input values, linear computation with respect to a state amount related to the state of the vehicle; and to carry out nonlinear computation with direct or indirect reference to at least part of a result of the linear computation, the plurality of input values including a road surface displacement and an operation input, the plurality of output values including a sprung vertical speed, a roll rate, and a pitch rate; and
  control a damping force of a suspension of the vehicle based on the linear and nonlinear computation.

11. A suspension control device configured to control a damping force of a suspension, the suspension control device comprising:
an electronic control unit (ECU) configured to:
estimate a state of a vehicle,
  calculate a plurality of output values by carrying out, with reference to a plurality of input values, linear computation with respect to a state amount related to the state of the vehicle;
  carry out nonlinear computation with direct or indirect reference to at least part of a result of the linear computation carried out by the ECU, the state amount related to the state of the vehicle including a sprung speed of the vehicle, a sprung angular speed of the vehicle, and an unsprung speed of a wheel; and
  control the damping force of the suspension of the vehicle based on the linear and nonlinear computation.

12. A suspension control device configured to control a damping force of a suspension, the suspension control device comprising:
an electronic control unit (ECU) configured to:
estimate a state of a vehicle,
calculate a plurality of values by carrying out, with reference to a plurality of input values, linear computation with respect to a state amount related to the state of the vehicle;
  carry out nonlinear computation with direct or indirect reference to at least part of a result of the linear computation carried out by the ECU, the plurality of values including a road surface displacement and an operation input, the plurality of output values including a sprung vertical speed, a roll rate, and a pitch rate; and
  control the damping force of the suspension of the vehicle based on the linear and nonlinear computation.

13. A suspension device, comprising:
a suspension; and
an electronic control unit (ECU) configured to:
  estimate a state of a vehicle,
  calculate a plurality of output values by carrying out, with reference to a plurality of input values, linear computation with respect to a state amount related to the state of the vehicle, the state amount related to the state of the vehicle including a sprung speed of the vehicle, a sprung angular speed of the vehicle, and an unsprung speed of a wheel
  carry out nonlinear computation with direct or indirect reference to at least part of a result of the linear computation; and
control a damping force of the suspension of the vehicle based on the linear and nonlinear computation.

14. A suspension device, comprising:
a suspension; and
an electronic control unit (ECU) configured to:
  estimate a state of a vehicle,
  calculate a plurality of output values by carrying out, with reference to a plurality of input values, linear computation with respect to a state amount related to the state of the vehicle;
  carry out nonlinear computation with direct or indirect reference to at least part of a result of the linear computation carried out by the ECU,
  the plurality of input values including a road surface displacement and an operation input,
  the plurality of output values including a sprung vertical speed, a roll rate, and a pitch rate; and
  control a damping force of the suspension of the vehicle based on the linear and nonlinear computation.

* * * * *